350-422

XR 3,665,834

United Sta
Loewe

[15] 3,665,834
[45] May 30, 1972

[54] MOTION PICTURE CAMERA WITH ZOOM LENS

[72] Inventor: Richard Loewe, Stuttgart-Feuerbach, Germany

[73] Assignee: Robert Bosch Photokino GmbH, Stuttgart-Untertuerkheim, Germany

[22] Filed: Aug. 12, 1970

[21] Appl. No.: 63,097

[30] Foreign Application Priority Data

Aug. 16, 1969 Germany.....................P 19 41 789.1

[52] U.S. Cl. .........................95/44 R, 88/1.5 NR, 350/183, 350/184, 350/187, 352/140
[51] Int. Cl. ................G03b 3/00, G03b 13/16, G03b 13/26
[58] Field of Search .................95/44, 42; 352/140; 350/183, 350/184, 187; 88/1.5 NR

[56] References Cited
UNITED STATES PATENTS 3,083,628  4/1963  Tsugawa..........................88/1.5 UX

*Primary Examiner*—Samuel S. Matthews
*Assistant Examiner*—Richard A. Wintercorn
*Attorney*—Michael S. Striker

[57] ABSTRACT

A motion picture camera wherein the lever which is movable to change the focal length of the zoom lens controls a carriage which moves a system of magnifying lenses into registry with the eyepiece of the through-the-lens viewfinder so that the user can see a greatly enlarged portion of the image prior to and during manipulation of the focusing ring. The lever places the magnifying lenses into registry with the eyepiece of when the zoom lens is adjusted for maximum focal length. A leaf spring in the lens mount biases the lever to a position in which the lever permits movement of the magnifying lenses out of registry with the eyepiece and places a second system of lenses into registry with the eyepiece. The second system of lenses does not appreciably magnify the viewed image.

10 Claims, 2 Drawing Figures

Patented May 30, 1972

3,665,834

INVENTOR
Richard LOEWE

By his ATTORNEY

3,665,834

MOTION PICTURE CAMERA WITH ZOOM LENS

BACKGROUND OF THE INVENTION

The present invention relates to improvements in motion picture cameras with zoom lenses, and more particularly to improvements in motion picture cameras with zoom lenses and through-the-lens viewfinders.

In motion picture cameras with zoom lenses and through-the-lens viewfinders, the focussing is carried out when the operator of the camera sees in the viewfinder a greatly magnified image of the subject or scene, namely, when the zoom lens is adjusted for maximum focal length. This insures more accurate focussing. It was found, however, that the magnification by the viewfinder objective cannot invariably insure focussing with requisite accuracy. Therefore, certain motion picture cameras embody various auxiliary focussing devices or focussing aids, such as magnifying lenses, sharpness indicators or the like. Such auxiliary focussing devices can be moved into the beam of light which enters the eyepiece of the viewfinder at the time when the zoom lens is set for maximum focal length. The operator is then in a position to accurately determine and/or focus to insure maximum sharpness while the zoom lens furnishes a greatly enlarged viewfinder image.

In order to insure that the focussing is carried out when the zoom lens is set for maximum focal length, certain motion picture cameras embody means for automatically adjusting the zoom lens for maximum focal length as soon as the auxiliary focussing device is moved into the path of light entering the viewfinder eyepiece. Reference may be had to German Pat. No. 1,197,745. A drawback of such cameras is that their manipulation is rather complicated because they must be provided with two discrete actuating means, namely, one for moving the auxiliary focussing device into or from the path of light which enters the eyepiece of the viewfinder and the other for selection of a shorter focal length. Thus, in order to properly focus, the operator of the just described conventional motion picture camera must manipulate a first handgrip member so as to move the auxiliary focussing device (e.g., a magnifying lens) into the path of light entering the eyepiece of the viewfinder, the focussing ring is thereupon manipulated to carry out the focussing operation, the first handgrip member is thereupon manipulated to move the auxiliary device out of the light path, and a second handgrip member is manipulated to select a shorter focal length. The handgrip members can transmit motion by way of suitable mechanical trains or by actuating electric switches which start or arrest one or more motors in the camera.

SUMMARY OF THE INVENTION

An object of the invention is to provide a motion picture camera with a zoom lens and with a through-the-lens viewfinder wherein a single actuating member suffices to assist in accurate focussing and also to select an appropriate focal length.

Another object of the invention is to provide a motion picture camera wherein the auxiliary focussing device or devices which serve as focussing aids need not be manipulated by hand but automatically assume an optimum position with reference to the eyepiece of the viewfinder when the operator of the camera is ready for focussing.

An additional object of the invention is to provide a motion picture camera wherein the actuating means for adjusting the focal length of the zoom lens is automatically ready to change the focal length in response to even minimal displacement of its input member as soon as the focussing operation is completed.

A further object of the invention is to provide a novel operative connection between one or more focussing aids in a motion picture camera and the actuating means for changing the focal length of the zoom lens.

Still another object of the invention is to provide an operative connection of the above outlined character which is simple compact and rugged, and which can be installed in existing types of motion picture cameras with minimal alterations in their basic design.

The improved motion picture camera comprises a picture taking lens of variable focal length, actuating means movable between a plurality of positions to thereby change the focal length of the lens, a viewfinder, focussing means, an auxiliary focussing device movable into and out of registry with the viewfinder, and an operative connection between the actuating means and the auxiliary focussing device for moving the latter into registry with the viewfinder within a predetermined range of positions of the actuating means. The viewfinder is preferably of a through-the-lens viewfinder and the auxiliary focussing device may comprise a system of magnifying lenses which are movable into and out of registry with the eyepiece of the viewfinder.

The auxiliary focussing device can be held in registry with the viewfinder when the actuating means assumes a range of positions each of which corresponds to the maximum focal length of the picture taking lens.

The camera preferably further comprises means for biasing the actuating means to a given position in which the operative connection is free to move the auxiliary focussing device out of registry with the viewfinder. Such biasing means may comprise a leaf spring bearing against a lever which forms part of the actuating means and is turnable in a slot provided in the tubular mount for the picture taking lens.

The operative connection may comprise a cam and follower arrangement which cooperates with a spring to effect movements of a carriage for the auxiliary focussing device between two end positions in one of which the auxiliary focussing device registers with the eyepiece of the viewfinder and in the other of which the eyepiece registers with another system of lenses which do not appreciably enlarge the viewed subject or scene.

The novel features which are considered as characteristic of the invention are set forth in particular in the appended claims. The improved motion picture camera itself, however, both as to its construction and its mode of operation, together with additional features and advantages thereof, will be best understood upon perusal of the following detailed description of certain specific embodiments with reference to the accompanying drawing.

DESCRIPTION OF THE PREFERRED EMBODIMENTS

Figure 1:
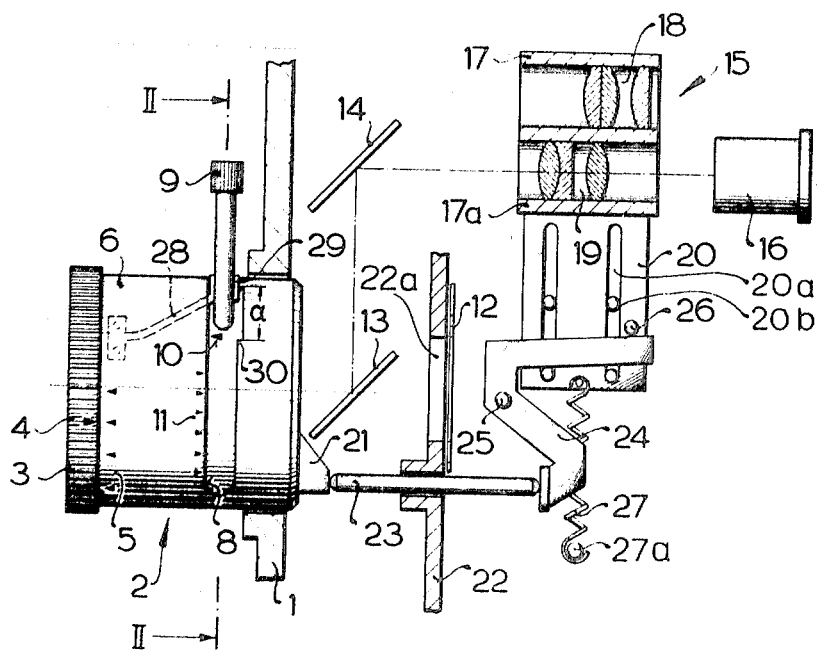
FIG. 1 is a fragmentary longitudinal vertical sectional view of a motion picture camera which embodies the invention.
Figure 2:
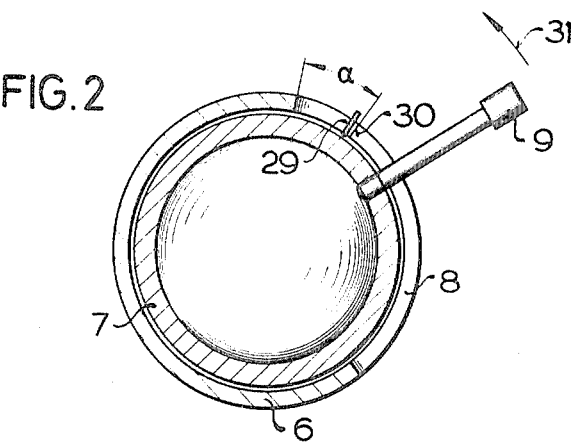
FIG. 2 is a transverse vertical sectional view as seen in the direction of arrows from the line II—II of FIG. 1.

FIG. 1 shows a portion of a motion picture camera having a housing whose front wall 1 supports a pancratic picture-taking zoom lens 2. The front portion of the tubular mount 6 for the lens 2 supports a knurled or milled focussing ring 3 having an index 4 which can be moved into registry with the graduations of a distance scale 5 of the lens mount 6. The lens mount is fixed to the front wall 1 of the housing and accommodates a cylindrical sleeve 7 (FIG. 2) which is rotatable about its axis. The sleeve 7 is coupled with the optical elements of the picture-taking lens 2 and its rotation causes such elements to move in the direction of the optical axis. The connection between the sleeve 7 and the optical elements preferably comprises cam grooves and followers. Such axial displacement of the optical elements effects appropriate changes in focal length of the lens 2. The actuating means for changing the focal length of the lens 2 further comprises a handgrip member or lever 9 which extends radially outwardly through a circumferentially extending slot 8 of the lens mount 6. The sleeve 7 has an index 10 which is observable in the slot 8 and is movable into registry with the graduations of a scale 11 on the lens mount 6.

A partially light transmitting mirror 13 is placed at an angle of 45° into the path of incoming scene light to deflect a certain percentage of such light against a fully reflecting mirror 14. The latter directs the twice deflected light beam into the eyepiece 16 of a through-the-lens viewfinder. An optical unit 15 is disposed between the eyepiece 16 and the mirror 14.

The optical unit 15 comprises two sets of lenses 18, 19 which are respectively installed in cylinders 17, 17a. These cylinders are secured to a carriage 20 which is reciprocable at right angles to the optical axis of the eyepiece 16. The carriage 20 is movable between first and second positions in which the eyepiece 16 respectively registers with the lenses 18 and 19. The optical characteristics of the lenses 18 and 19 are such that the lenses 18 at most effect an insignificant magnification of the image and that the lenses 19 effect a substantial magnification of the image or of a portion of the image. Therefore, the lenses 19 are used as auxiliary focussing means or focussing aid when the actuating means 7,9 assumes a position corresponding to the maximum focal length of the lens 2. This facilitates accurate focussing by means of the ring 3.

In order to reduce the number of manipulations which are necessary to insure sharp focussing, the optical unit 15 is coupled with the lever 9 of the actuating means for the zoom lens 2 in such a way that the lenses 19 are automatically moved into registry with the eyepiece 16 when the lever 9 assumes a predetermined range of angular positions. In the illustrated embodiment, the lenses 19 are in registry with the eyepiece 16 when the lever 9 assumes a position within the angle alpha shown in FIG. 2. The lever 9 assumes such positions when the zoom lens 2 is adjusted for maximum focal length. Such maximum focal length remains unchanged when the lever 9 moves within the angle alpha.

The operative connection between the actuating means 7, 9 and the carriage 20 for the cylinders 17, 17a of the lenses 18, 19 comprises a rotary ring-shaped cam 21 which is rigid with the sleeve 7 and has a cam face provided with a lobe adapted to displace a motion transmitting follower pin 23 which is guided in a partition 22 of the housing. The partition 22 has a window 22a through which the light, which has passed through the mirror 13, can reach an unexposed frame of the motion picture film 12. The right-hand end of the follower pin 23 abuts against the lower arm of a bell crank lever 24 which is pivotable on a fixed pin 25 and is biased in a clockwise direction by a helical spring 27 which is coupled to the carriage 20 and is attached to a post 27a of the housing. The carriage 20 has a projection 26 which abuts against the upper arm of the lever 24 under the action of the spring 27. The carriage further has elongated slots 20a receiving guide pins 20b which are mounted in the housing. The spring 27 can bias the left-hand end of the follower pin 23 against the face of the cam 21 by way of the carriage 20, projection 26 and lever 24. Stops (not shown) are provided to arrest the carriage 20 in the two end positions in which the eyepiece 16 respectively registers with the lenses 18 and 19.

The camera further comprises resilient means for biasing the lever 9 toward a given position. Such resilient means comprises a leaf spring 28 which is mounted in the interior of the lens mount 6 and biases the lever 9 downwardly, as viewed in FIG. 1, toward the lower end of the portion alpha of the path. Thus, the lever 9 must be pivoted by hand in order to move the lenses 19 into register with the eyepiece 16. When the lever 9 is released while it assumes a position within the range indicated by the angle alpha, it automatically moves under the action of the spring 28 and assumes that given angular position in which it immediately begins to change the focal length if it turns in a clockwise direction, as viewed in FIG. 2. The lobe of the cam 21 then moves away from the follower pin 23 so that the spring 27 is free to contract and to move the carriage 20 to its lower end position in which the lenses 18 register with the eyepiece 16. The leaf spring 28 has a plate-like portion 29 which extends into the slot 8 of the lens mount 6 and into the path of movement of the lever 9. That portion of the slot 8 in which the lever 9 advances while it assumes a position within the angle alpha is wider than the remaining part of the slot and the lens mount defines a shoulder or stop 30 against which the portion 29 of the spring 28 abuts when the lever 9 is moved beyond the range of positions within the angle alpha.

The operation:

In order to properly focus, the user of the camera moves the lever 9 to the position shown in FIG. 1 in which the lever assumes a position within the range identified by the angle alpha. This necessitates pivoting of the lever 9 in the direction indicated by the arrow 31 (FIG. 2) whereby the stem of the lever engages the portion 29 of the spring 28 and moves it away from the shoulder 30 to stress the spring. The lever 9 can be moved all the way to its extreme position in which the portion 29 of the spring 28 abuts against the surface at the left-hand end of the slot 8, as viewed in FIG. 2. As the lever 9 engages and pushes the portion 29 of the spring 28, the lobe of the cam 21 (which rotates with the lever 9 because it is rigid or integral with the sleeve 7) engages and shifts the follower pin 23 which pivots the lever 24 in a counterclockwise direction against the opposition of the spring 27. The carriage 20 moves upwardly and places the auxiliary focussing device (lenses 19) into registry with the eyepiece 16 of the viewfinder. Such position of the carriage 20 and lenses 19 is shown in FIG. 1. The user thereupon rotates the focussing ring 3 until the eye looking into the eyepiece 16 sees a sharp image of a sharply defined portion of the image. This completes the focussing operation.

The user thereupon leaves the ring 3 in the selected position and can pivot the lever 9 to any desired position to select an appropriate focal length. The lobe of the cam 21 moves beyond the follower pin 23 as soon as the portion 29 of the leaf spring 28 reengages the shoulder 30 of the lens mount 6. From there on, the focal length changes because the positions of the lever 9 are outside of the range indicated by the angle alpha. Also, as the lobe of the cam 21 moves away from the follower pin 23, the spring 27 is free to contract so that the carriage 20 moves downwardly and returns the lenses 18 into registry with the eyepiece 16. Thus, the user sees the subject of scene in actual size or on a slightly enlarged scale.

If the user wishes to make exposures with maximum focal length, the lever 9 is simply released after the user completes the focussing operation. This enables the spring 28 to dissipate energy until its portion 29 engages the shoulder 30 whereby the lever 9 is pushed to the given position at the lower limit of the range of positions within the angle alpha; such given position still corresponds to the maximum focal length. Also, the lenses 18 automatically return into registry with the eyepiece 16 because the spring 27 can contact as soon as the lobe of the cam 21 moves beyond the adjacent end of the follower pin 23. This takes place when the portion 29 of the leaf spring 28 reaches the shoulder 30.

An important advantage of the improved motion picture camera is that the auxiliary focussing device (i.e., the lenses 19) need not be moved by a separate handle, lever, knob, switch or other actuating means. This auxiliary focussing device is moved into and out of registry with the eyepiece 16 of the viewfinder in automatic response to manipulation of the lever 9 for the zoom lens 2. It is clear that the lever 9 can be replaced by a knob or pushbutton which controls a switching arrangement for a motor capable of adjusting the zoom lens to change the focal length. The manipulation of the improved camera is simpler than that of aforedescribed conventional cameras wherein the auxiliary focussing device or devices must be moved into and away from registry with the eyepiece of the viewfinder by discrete actuating means. Therefore, the camera of my invention can be readily operated by unskilled beginners or by inexperienced amateur photographers. Since the spring 28 always biases the lever 9 to a given position which still corresponds to maximum focal length of the zoom lens 2 but in which the lever 9 immediately begins to change the focal length when moved clockwise, as viewed in FIG. 2, the user sees an image which is not enlarged at all or is enlarged only negligibly (lenses 18) as soon as the lever 9 is released as well as when the angular movement of the lever 9 actually results in a change of focal length. Consequently, the user of the camera need not be concerned with the positioning of lenses 18 and 19 because the lenses 18 are invariably in registry with the eyepiece 16 when the lever 9 is released as well as when the lever 9 is moved for the purpose of changing the focal length. In the course of one or more exposures, the user of the camera should see the entire image, not only an enlarged portion of such image; therefore, the eyepiece 16 should register with the lenses 18 whenever the camera is in the process of making one or more exposures.

Without further analysis, the foregoing will so fully reveal the gist of the present invention that others can, by applying current knowledge, readily adapt it for various applications without omitting features which fairly constitute essential characteristics of the generic and specific aspects of my contribution to the art and, therefore, such adaptations should and are intended to be comprehended within the meaning and range of equivalence of the claims.

What is claimed as new and desired to be protected by Letters Patent is set forth in the appended.

1. In a motion picture camera, a combination comprising an objective lens of variable focal length; actuating means movable between a plurality of positions to thereby change the focal length of said lens while moving between at least some of said positions; an eyepiece receiving light which passes through said objective lens focussing means; focussing aid means movable into and out of registry with said eyepiece; and an operative connection between said actuating means and said focussing aid means for moving the latter into registry with said eyepiece within a predetermined range of positions of said actuating means preparatory to actuation of said focussing means and to move said focussing aid means out of registry with said eyepiece when said actuating means leaves said range of positions.

2. In a motion picture camera, a combination comprising a picture taking lens of variable focal length; actuating means movable between a plurality of positions to thereby change the focal length of said lens said positions; a through-the-lens viewfinder; focussing means; focussing aid means movable into and out of registry with said viewfinder; and operative connection between said actuating means and said focussing aid means for moving the latter into registry with said viewfinder within a predetermined range of positions of said actuating means.

3. A combination as defined in claim 2, wherein said operative connection comprises means for moving said focussing aid means out of registry with said viewfinder when said actuating means leaves said range of positions.

4. In a motion picture camera, a combination comprising a picture taking lens of variable focal length; actuating means movable between a plurality of positions including two end positions to thereby change the focal length of said lens while moving between at least some of said positions; a viewfinder; focussing means; focussing aid means movable into and out of registry with said viewfinder; and an operative connection between said actuating means and said focussing aid means for moving the latter into registry with said viewfinder within a predetermined range of positions of said actuating means, said range of positions being adjacent to one of said end positions.

5. A combination as defined in claim 4, wherein said range of positions corresponds to the maximum focal length of said lens.

6. A combination as defined in claim 5, further comprising means for biasing said actuating means to a given position outside of said range, said given position corresponding to the maximum focal length of said lens.

7. A combination as defined in claim 6, further comprising a housing and a tubular lens mount on said housing, said means for biasing comprising a spring provided in said mount and bearing against a portion of said actuating means when the latter assumes a position within said range.

8. In a motion picture camera, a combination comprising a picture taking lens of variable focal length; actuating means movable between a plurality of positions to thereby change the focal length of said lens while moving between at least some of said positions; a viewfinder; focussing means; focussing aid means movable into and out of registry with said view finder; and an operative connection between said actuating means and said focussing aid means for moving the latter into registry with said viewfinder within a predetermined range of positions of said actuating means, said operative connection comprising a carriage for said focussing aid means and a cam-and-follower drive receiving motion from said actuating means and arranged to move said carriage to a position in which said focussing aid means registers with said viewfinder.

9. A combination as defined in claim 8, further comprising means for biasing said carriage to a second position in which said focussing aid means is out of registry with said viewfinder.

10. In a motion picture camera, a combination comprising a picture taking lens of variable focal length; actuating means movable between a plurality of positions to thereby change the focal length of said lens while moving between at least some of said positions; a through-the-lens viewfinder having an eyepiece; focussing means coaxial with said lens; focussing aid means movable into and out of registry with said eyepiece of said viewfinder; and an operative connection between said actuating means and said focussing aid means for moving the latter into registry with said eyepiece of said viewfinder within a predetermined range of positions of said actuating means.

* * * * *